US006715668B2

(12) United States Patent
Jaidka

(10) Patent No.: US 6,715,668 B2
(45) Date of Patent: Apr. 6, 2004

(54) FUSION WELDED LIQUEFIABLE GAS CYLINDER WITH OVERPRESSURE PROTECTION HEADS AND METHOD FOR MAKING THE SAME

(75) Inventor: Ravi Jaidka, Yamunanagar (IN)

(73) Assignee: Indian Sugar and General Engineering Corp., Haryana (IN)

( * ) Notice: Subject to any disclaimer, the term of this patent is extended or adjusted under 35 U.S.C. 154(b) by 31 days.

(21) Appl. No.: 10/176,603

(22) Filed: Jun. 24, 2002

(65) Prior Publication Data

US 2002/0179684 A1 Dec. 5, 2002

Related U.S. Application Data

(62) Division of application No. 09/543,568, filed on Apr. 5, 2000, now Pat. No. 6,499,646.

(51) Int. Cl.[7] ............................ B23K 31/02; F17C 1/00

(52) U.S. Cl. .................... 228/184; 62/45.1; 220/560.06

(58) Field of Search ................................ 228/155, 104, 228/124.6, 141.1, 184; 29/890.14, 513, 525; 220/560.04–560.15, 581–592; 206/0.6, 0.7; 219/59.1, 60 R, 60.2, 61; 62/45.1–54.3

(56) References Cited

U.S. PATENT DOCUMENTS 3,653,434 A * 4/1972 Andersson .................. 165/169
3,764,036 A * 10/1973 Dale et al. ............. 220/560.05
4,000,826 A * 1/1977 Rogers ........................ 220/586
4,956,975 A * 9/1990 Gustafson ................... 62/50.7
5,123,573 A * 6/1992 Kucherer .................... 222/325
5,676,512 A * 10/1997 Diamond et al. .............. 413/4
5,704,513 A * 1/1998 Diamond et al. ........... 220/619
5,758,796 A * 6/1998 Nishimura et al. ......... 220/590
5,797,522 A * 8/1998 Evans et al. ............ 222/464.4
5,954,239 A * 9/1999 Evans et al. ............ 222/464.4
6,019,252 A * 2/2000 Benecke et al. .............. 222/95
6,197,445 B1 * 3/2001 Ward et al. ................. 429/163
6,203,940 B1 * 3/2001 Oltman et al. .............. 429/122
6,499,646 B1 * 12/2002 Jaidka ........................ 228/104
2002/0179684 A1 * 12/2002 Jaidka

OTHER PUBLICATIONS

Engineering Drawing No. 181 of Ton Container DOT 106 A500X, The Chlorine Institute, Inc.

* cited by examiner

*Primary Examiner*—Kiley Stoner
(74) *Attorney, Agent, or Firm*—Arent Fox Kintner Plotkin & Kahn, PLLC

(57) ABSTRACT

A liquefiable gas pressure cylinder and method for making the same with the cylinder including a cylindrical shell, and heads fusion welded at opposites ends of the shell. The side ends where the heads are joined to the shell are crimped radially inward to each end to form chimes. The welds are 100% radiographed and heat treated. The heads are dished to have a domed center portion which has a profile and thickness so that the domed center portions will reverse before any other part of the cylinder is stressed beyond a yield limit for such part.

5 Claims, 4 Drawing Sheets

Fig. 2A
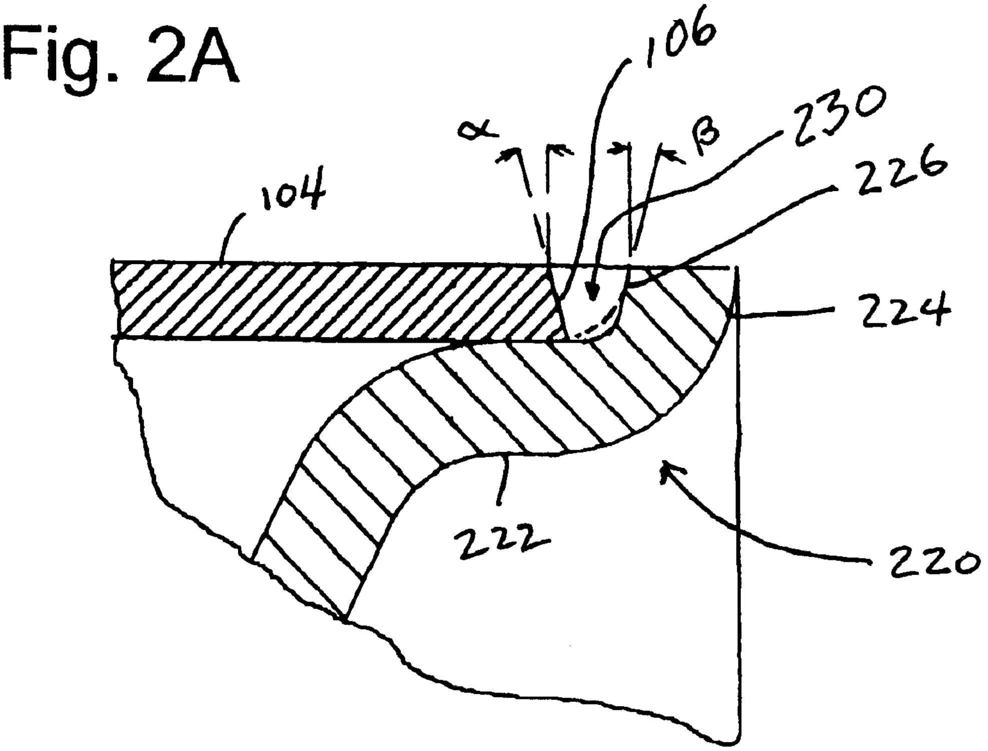
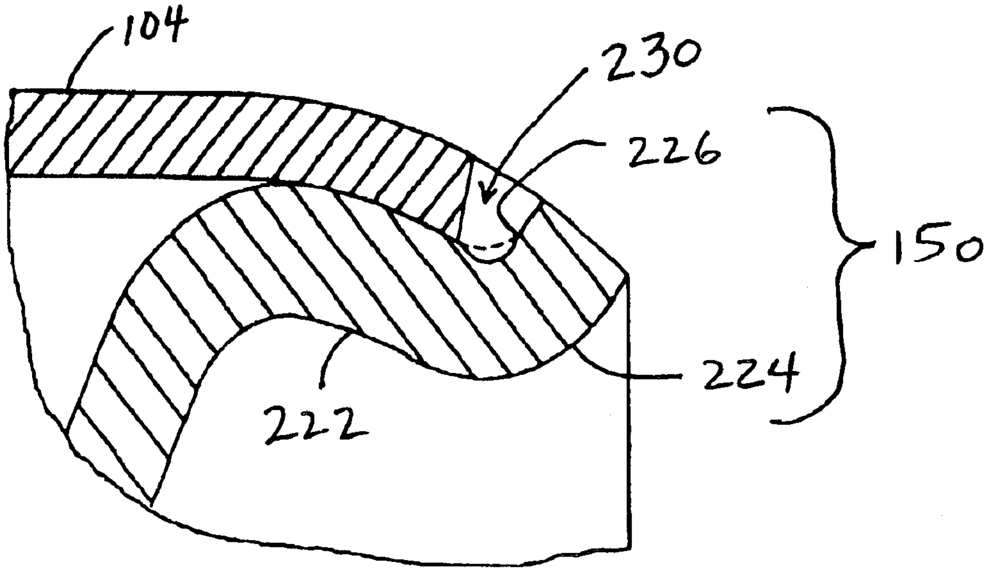
Fig. 2B

FUSION WELDED LIQUEFIABLE GAS CYLINDER WITH OVERPRESSURE PROTECTION HEADS AND METHOD FOR MAKING THE SAME

This is a Division of application Ser. No. 09/543,568 filed Apr. 5, 2000, now U.S. Pat. No. 6,499,646. The disclosure of the prior application(s) is hereby incorporated by reference herein in its entirety.

BACKGROUND OF THE INVENTION

The present invention relates to pressure vessels, and more particularly, to pressure vessels for the safe transportation of low pressure liquefiable gases up to 1000 Kgs. capacity.

Cylindrical vessels having circumferential welded joints have been known for the transport of liquefiable gases. These joints were prepared by a forged welding process. Further, no radiography on those joints was carried out. Without radiography of each joint, the extent of bonding in the circumferential weld joints was not known. Consequently, the safety of the cylinders was suspect.

Conventionally in the drum art, a chime is an integral part of the drum which can extend radially outwardly from its lateral surface. Often used for rolling the drum, chimes can also be provided at the ends of the drum for "handling" by cranes. Additionally, a chime can be considered to extend axially of a drum or pressure vessel. When used in conjunction with a lifting bar, such a pressure vessel or drum can be moved by a crane.

OBJECTS AND SUMMARY OF THE INVENTION

The present invention is particularly suitable for the transport of low pressure liquefiable gases, such as chlorine, sulphur dioxide, ammonia etc.

In view of the foregoing disadvantages inherent in the known types of liquefiable gas pressure cylinder now present in the prior art, the present invention provides a Liquefiable gas pressure cylinder wherein the same is arranged to have overpressure protection built-in for assured safety. This is enabled by the design of the heads and by the particular method and manner of construction of the cylinder.

As such, the general purpose of the present invention, which will be described subsequently in greater detail, is to provide a new and improved liquefiable gas pressure cylinder which has all the advantages of the prior art liquefiable gas pressure cylinder and none of the disadvantages.

To attain this, the present invention provides a liquefiable gas pressure cylinder comprising: a shell; and heads fusion welded at opposites ends of the shell; wherein side ends where the heads are joined to the shell are crimped radially inward to each end to form chimes.

The liquefiable gas pressure cylinder as above can have the shell be a straight cylinder having a single longitudinal welded seam defining the cylinder body and opposite axial end portions; the heads be circular each having a domed center portion and a flanged periphery, the flanged periphery having a cylinder portion surrounding the domed center portion and a radially extending edge portion, an outer diameter of the cylinder portion being equal to an internal diameter of the shell so that when the heads are mounted into the shell with the domed center portion extending axially inwardly, the cylinder portion being press-fitted into the end portions of the shell.

The liquefiable gas pressure cylinder as above can have a gap defined between each the end axial edge of the end portions of the shell and a side face of the radially extending edge portion of the head; the end axial edge of the shell be beveled at a first angle to a radius of the shell; the side face of the radially extending edge portion of the head be machined to have a sharper radius and a corresponding face bevel of at a second angle; and an overlap of the shell with the cylinder portion of the head form a lap joint configuration with the gap, the shell and the heads being joined by fusion welding in the gap.

The liquefiable gas pressure cylinder as above can have the heads be provided with at least one tapped hole at a radius distance from a center of the domed portion; and the cylinder further comprise a fusible plug screwed into each the tapped hole.

The liquefiable gas pressure cylinder as above can have the heads be provided with two additional holes which are also tapped; and the cylinder further comprise valves with siphon pipes attached installed in the additional holes.

The liquefiable gas pressure cylinder as above can have the heads have a profile and thickness so that the domed center portions will reverse before any other part of the cylinder is stressed beyond a yield limit for such part.

Another aspect of the invention resides in a method of making a liquefiable gas pressure cylinder comprising the steps of: forming a cylindrical shell including a cylinder body and end portions; forming two heads, each head having a domed center portion and a flanged periphery, the flanged periphery having a cylinder portion surrounding the domed center portion and a radially extending edge portion, an outer diameter of the cylinder portion being equal to an internal diameter of the shell; press-fitting the two heads at opposite ends of the shell with the domed center portion extending axially inwardly, and the cylinder portion being fitted into the end portions of the shell; cold forming the end portions and the flanged periphery radially inwardly; and fusion welding the end portions and the flanged periphery together.

The method as above can further comprise radiographing all welds.

The method as above can further comprise heat treating the welded the end portions and the flanged periphery.

The method as above can further include wherein the cold forming results in a radially inwardly directed bend to the extent of at least 1 inch from straight cylindrical diameters as measured before bending.

The method as above can further comprise prior to forming the heads, determining a profile and thickness so that the domed center portions will reverse before any other part of the cylinder is stressed beyond a yield limit for such part.

The welded, radiographed and chimed ends of the present invention are unique because this design ensures that the stresses in the circumferential weld joints are very low. In the event of accidental over pressure or fall from a truck, if pressure exceeds eight times the working pressure, the container will not burst. One of the dished end will reverse outwardly and internal pressure of the container will come down, which ensures built in safety.

The fusion welding construction of the circumferential joints ensures complete fusion welding between shell and dished end which is verified through radiography. By prototype test followed by finite element analysis and strain gauge testing it has been proved (in case of ISGEC Container) that stress concentration on circumferential joint is lowest. This type of cylinder or drum can withstand 8 times the working pressure without any failure. This is an improvement over the old forging process, where lack of bonding during forging can go unnoticed.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the following Abstract of the Disclosure is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved liquefiable gas pressure cylinder which has all the advantages of the prior art liquefiable gas pressure cylinder and none of the disadvantages.

It is another object of the present invention to provide a new and improved liquefiable gas pressure cylinder which may be easily and efficiently manufactured and marketed.

It is a further object of the present invention to provide a new and improved liquefiable gas pressure cylinder which is of a durable and reliable construction.

An even further object of the present invention is to provide a new and improved liquefiable gas pressure cylinder which is susceptible of a low cost of manufacture with regard to both materials and labor, and which accordingly is then susceptible of low prices of sale to industry, thereby making such liquefiable gas pressure cylinder economically available to the businesses that need it.

Still yet another object of the present invention is to provide a new and improved liquefiable gas pressure cylinder which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2A is a partial cross-section of one end portion of the shell and head during the manufacturing process prior to welding and cold chiming;

FIG. 2B is a partial cross-section of one end portion of the shell and head during the manufacturing process following welding and cold chiming;

DESCRIPTION OF THE PREFERRED EMBODIMENT

Figure 1:
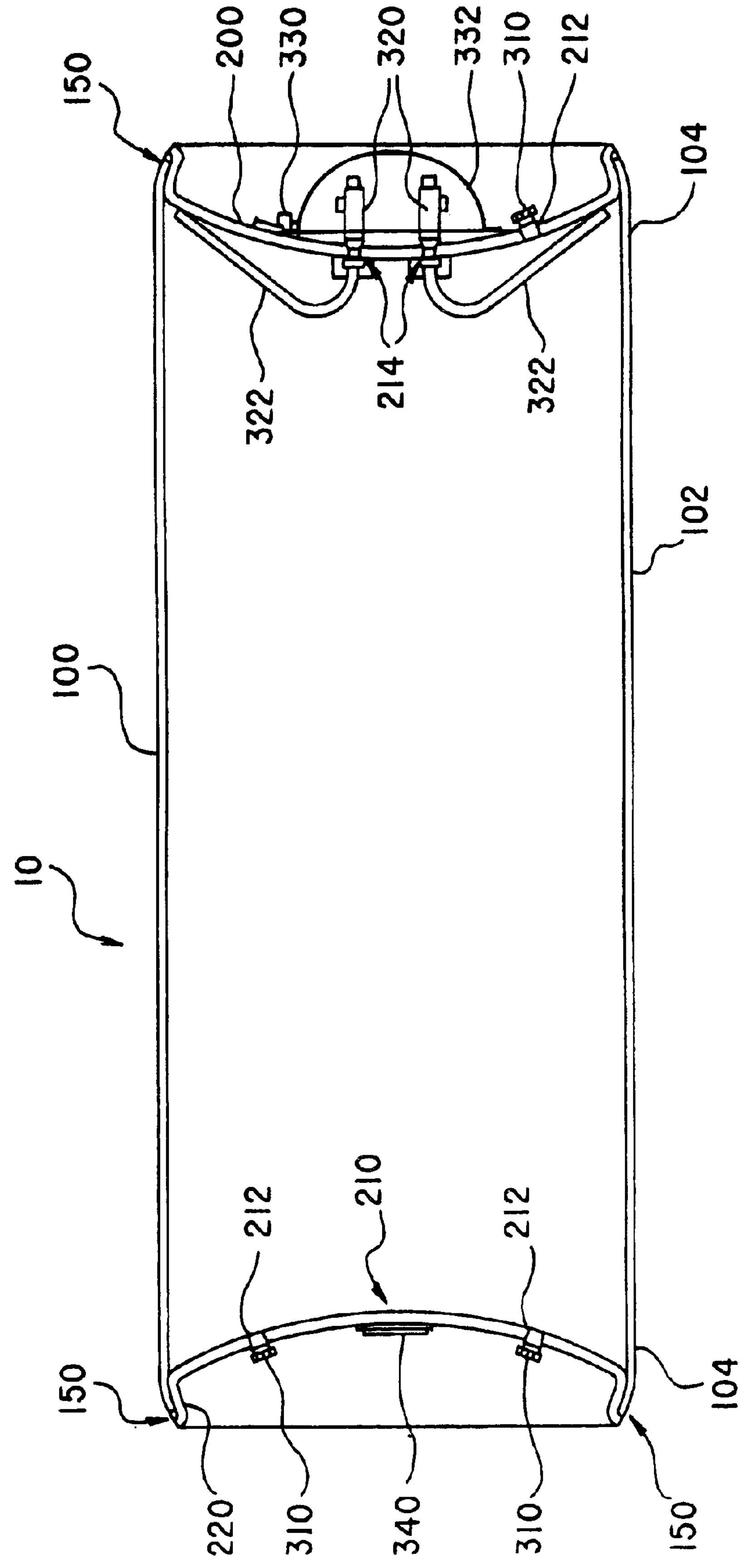
FIG. 1 is a cross-section view of a first embodiment of the present invention.
Figure 3:
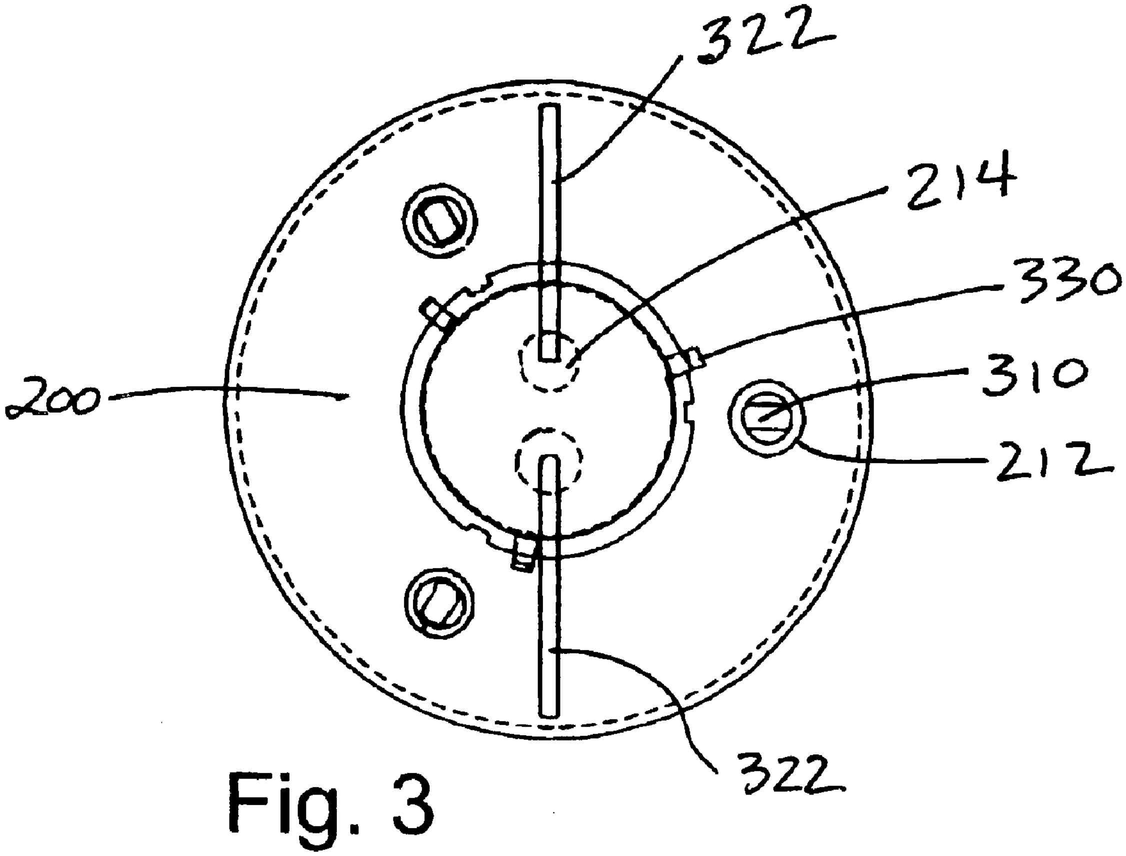
FIG. 3 is an end view of one of the heads.
Figure 4:
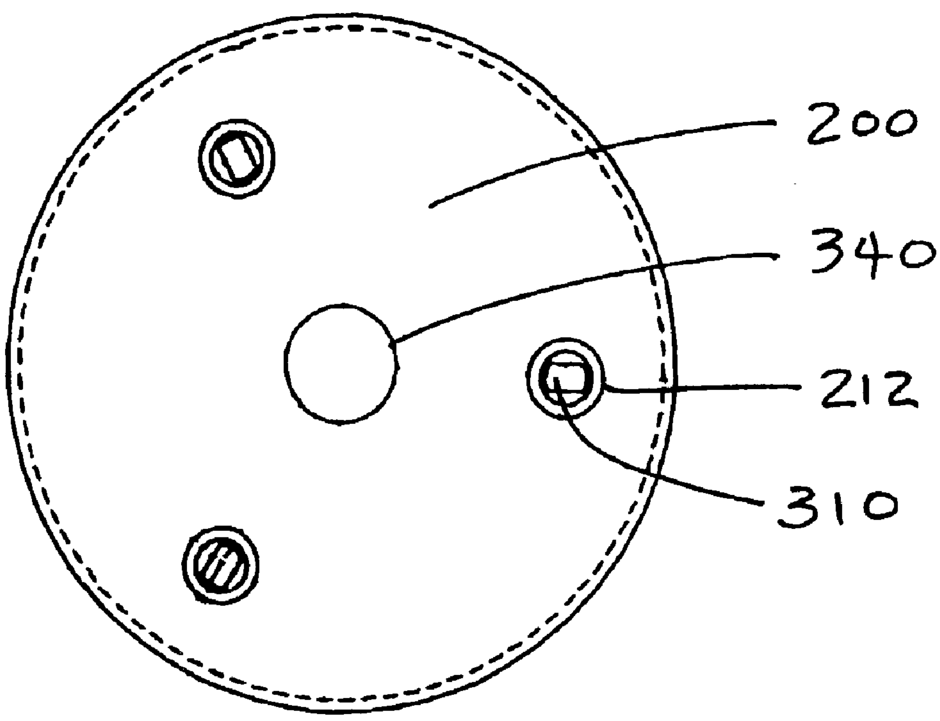
FIG. 4 is an end view of the other head.

With reference now to the drawings, and in particular to FIGS. 1 to 4 thereof, a new and improved liquefiable gas pressure cylinder embodying the principles and concepts of the present invention and generally designated by the reference numeral 10 will be described.

More specifically, the liquefiable gas pressure cylinder 10 includes a main body or shell 100 with heads 200 at opposites ends thereof. The invention has been designed to conform to the requirements of 49 C.F.R. with dished ends or heads convex to pressure. The sides are crimped inward to each end to form chimes 150 which provide substantial grip for a lifting beam and also for easy installation of Safety Kit-B in case of emergency situation.

The main body or shell 100 is a straight cylinder having a single longitudinal welded seam defining the cylinder body 102 and opposite axial end portions 104. One example of a suitable shell 100 can be 13⁄32 inch thick with a 29 ¼ inch internal diameter with a length of approximately 81 inches. Such a shell would be the main body of a pressure vessel that can hold approximately 2000 pounds (English) of chlorine, thus having the name of a ton container.

The heads 200 are circular with a domed center portion 210 and a flanged periphery 220. The flanged periphery 220 has a cylinder portion 222 surrounding the domed center portion 210 and a radially extending edge portion 224. The outer diameter of the cylinder portion 222 is the same as the internal diameter of the shell 100 so that when the heads 200 are mounted into the shell 100 with the domed center portion 210 extending axially inwardly, the cylinder portion 222 is press-fitted into the end portions 104 of the shell 100. A gap 230 is left between the end axial edge 106 of the end portions 104 of the shell 100 and the side face 226 of the radially extending edge portion 224 of the head 200. The end axial edge 106 of the shell 100 is beveled at a first angle $\alpha$ of about 15° to a radius of the shell. The side face 226 of the radially extending edge portion 224 of the head 200 is machined to have a sharper radius and a corresponding face bevel at a second angle $\beta$ of 15°. The overlap of the shell 100 with the cylinder portion 222 of the head 200 forms a lap joint configuration with the gap 230 also providing a side dam for the weld pool and an additional surface for forming the fusion weldment. The angle of the initial bevel is preferably from 13° to 17°.

The minimum thickness acceptable for the head is 0.625 inches. The nominal thickness of the head or dome is selected so as to achieve the minimum thickness. Generally, the nominal thickness is from 18 mm to 20 mm. The plates are initially procured with a positive mill tolerance. The profile of the central portion of the head dome is a segment of a a sphere.

Prior to initial assembly, the heads 200 are drilled for tapped holes 212 preferably at equiangular positions 120° apart at approximately a ⅔ radius distance from center. The number and location of the holes 212 is determined by the particular application for which the container is being made. The holes 212 are tapped and after the welding and heat treatment (described herein below), fusible plugs 310 are screwed into the holes 212. In addition, one head 200 is fitted with two additional holes 214 which are also tapped. Appropriate valves 320 with siphon pipes 322 attached are installed in the additional holes 214. Three valve cover clips 330 are welded to the one head 200 at equiangular positions and a valve cover 332 is fitted over the valves 320 in a bayonet fitting manner. A name and data plate 340 can be provided on the domed center portion of the other head 200.

After welding, the overlapping portions of the shell 100 and the heads 200 are cold formed to set the chimes 150. The result is a radially inwardly directed bend to the extent of at least 1 inch from the straight cylindrical diameters as measured before bending. The heads 200 and shell 100 are welded together by fusion welding. The preferred type of fusion welding is submerged arc welding.

Post welding, the welds are radiographed 100%. That is, the complete length of the shell to head joint is fully (100%) radiographed before the cold chiming. The technique used is by panaromic technique using a compensating ring to compensate for the thickness variation.

Additionally, there is the welds are given a post weld heat treatment using a heating cycle including:

a) Loading temperature (maximum)=800° F.

b) Rate of heating=400° F./hour c) Soaking temperature=1148∓18° F.
Soaking time=60 minutes d) Rate of cooling=500° F./hour e) Unloading temperature=800° F.

The finished container is pressure checked and ready for service.

The containers will hold a minimum of 1600 pounds of water. Due to the greater density, the container will hold 2000 pounds of liquified chlorine, thus common name "ton" container. The design pressure limit for a ton container is 225 pounds per square inch (gauge). The design temperature limits for a ton container are 135° F. (maximum) and 32° F. (minimum), respectively. The shell and head material for a ton container are preferably ASTM A 516GR.70. The applicable design code is 49 C.F.R. 1.179 (e). Other limits and materials may be more suitable for other liquefiable gas usage. A person of skill in the art would be able to readily select the appropriate values and design accordingly.

The initial cylinder, after manufacturing, inspection including non-destructive testing, and post weld heat treatment, was hydraulically tested. Stretch measurement by dial gauges attached to shell and head was carried out before the hydro test, during the hydro test and after the hydro test to ensure that no permanent strain occurred.

Using Finite Element Stress Analysis technique, certain of the areas of the cylinder were plotted where maximum stresses are present and the locations where displacements are maximum. Thereafter, the stresses at the circumferential weld were compared with the other areas to ensure that the weld of the heads to the shell is not the weakest area of the container.

To validate the results obtained from the Finite Element Stress Analysis, the container was then subjected to Resistance Strain Gauge Measurement Test.

The dished ends profile and thickness has been determined through finite element analysis and resistance strain gauge testing to establish that the dished ends will reverse before any other part of the container i.e. longitudinal and circumferential weld joints or the valves are stressed beyond their yield limit.

The container is in compliance with Chlorine Institute recommendation and is also compatible with safety kit B In order to prevent over pressure due to the exposure of the container to very high temperature, the cylinder has provision for installation for fusible plugs, which are filled with low melting alloys rated to melt suitable to the conditions of a particular country where the container is desired to be sold and used. This is an additional safety features.

The cylinders of the present invention should be handled with a suitable lifting beam in combination with hoist or crane of at least 2 Ton capacity. The ton containers being trucked should be carefully chocked or clamped down on cradles to prevent shifting and rolling.

Adequate provision has been made in the container by providing chiming on both the ends for easy handling of the same. If required, rolling bands can be provided to enable lifting of the containers by a fork lift.

The unique features of the present invention include:

The dished ends profile and thickness has been determined through Finite Element Analysis and Strain Gauge Testing to establish that the dished ends will reverse before any other part of the container i.e. longitudinal and circumferential weld or the valves are stressed beyond their yield limit.

The welded, x-rayed and chimed ends ensure that the stresses in the circumferential weld joints are very low. It has been established by Proto-Type Testing that even at four times a design pressure the joint is safe.

Another unique feature of the design which adds to safety is the fact that the container does not burst even if the pressure exceeds four times the maximum working pressure, in the event of a fire or accidental over-filling. In such an eventuality, one of the dished ends reverses outwardly thereby lowering the pressure.

The welded construction of the circumferential joint ensures complete fusion between shell and the dished ends, which is verified through radiography. This is an improvement over the old forging process which is a dead art, where lack of bonding during forging can go un-noticed.

The cold chimed construction provides a safety features by not allowing slippage of the lifting tackle during handling of the container. The chimed construction also makes the container compatible with the Chlorine Institute kit B in case of an emergency situation.

Information taken from Drawing SKETCH PV-03-4998 referencing Drawing PV-01-1241 REV 8

| | |
|---|---|
| DESIGN CODE | 49-CODE OF FEDERAL REGULATION CH.1 (10-1-97 EDITION), PART 179 SUB E |
| DESIGN PRESSURE | 225 PSIG |
| DESIGN TEMPERATURE/MDMT | 131° F./32° F. |
| RADIOGRAPHY | 100% |
| POST WELD HEAT TREATMENT | YES |
| SURFACE PREPARATION | BY GRIT BLASTING |

-continued

| | |
|---|---|
| PAINTING | ONE COAT OF RED LEAD/ZINC CHROMATE PRIMER |
| WATER CAPACITY | 1600 LBS (MINIMUM) |
| CHLORINE CAPACITY | 2000 LBS |
| FUSIBLE PLUG | 6 |
| FILLING RATIO | 1.25 (MAX.) |
| HEAD & SHELL MATERIAL | ASTM A5165R.70 |
| INSPECTION | LLOYDS REGISTER INDUSTRIAL SERVICES (LRIS) |

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention of the United States is as follows:

What is claimed is:

1. A liquefiable gas pressure cylinder comprising:

a shell; and heads fusion welded at opposite ends of said shell, wherein side ends where said heads are joined to said shell are crimped radially inward to each end to form chimes, wherein the shell is a straight cylinder having a single longitudinal welded seam defining the cylinder body and opposite axial end portions; said heads are circular each having a domed center portion and a flanged periphery, said flanged periphery has a cylinder portion surrounding the domed center portion and a radially extending edge portion, an outer diameter of the cylinder portion being equal to an internal diameter of said shell so that when said heads are mounted into said shell with said domed center portion extending axially inwardly, said cylinder portion is press-fitted into said end portions of said shell.

2. The liquefiable gas pressure cylinder according to claim 1, wherein a gap is defined between each said end axial edge of said end portions of said shell and a side face of said radially extending edge portion of said head; said end axial edge of the shell is beveled at a first angle to a radius of said shell; said side face of the radially extending edge portion of the head is machined to have a sharper radius and a corresponding face bevel of at a second angle; and an overlap of said shell with said cylinder portion of said head forms a lap joint configuration with said gap, said shell and said heads being joined by fusion welding in said gap.

3. The liquefiable gas pressure cylinder according to claim 1, wherein said heads are provided with at least one tapped hole at a radius distance from a center of said domed portion; and said cylinder further comprises a fusible plug screwed into each said tapped hole.

4. The liquefiable gas pressure cylinder according to claim 1, wherein said heads are provided with two additional holes which are also tapped; and said cylinder further comprises valves with siphon pipes attached installed in said additional holes.

5. The liquefiable gas pressure cylinder according to claim 1, wherein said heads have a profile and thickness so that said domed center portions will reverse before any other part of the cylinder is stressed beyond a yield limit for such part.

* * * * *